(12) United States Patent
Venkatachalam et al.

(10) Patent No.: US 12,524,250 B1
(45) Date of Patent: Jan. 13, 2026

(54) SYSTEM AND PROCESS FOR ELIMINATING THE RISK IN MONOLITHIC APPLICATION DEPLOYMENT

(71) Applicant: Morgan Stanley Services Group Inc., New York, NY (US)

(72) Inventors: Thiru Venkatachalam, Monroe, NJ (US); Vasantha Kumar, Princeton, NJ (US); Aravind Vellaipandian, Monroe, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/077,813

(22) Filed: Mar. 12, 2025

(51) Int. Cl.
*G06F 9/44* (2018.01)
*G06F 8/60* (2018.01)
*G06F 8/71* (2018.01)
*G06F 9/445* (2018.01)

(52) U.S. Cl.
CPC ............ *G06F 9/44505* (2013.01); *G06F 8/60* (2013.01); *G06F 8/71* (2013.01)

(58) Field of Classification Search
CPC ................. G06F 1/32; G06F 9/44; G06F 1/12
See application file for complete search history.

(56) References Cited

U.S. PATENT DOCUMENTS

| | | |
|---|---|---|
| 10,108,533 B1 | 10/2018 | Parasuraman et al. |
| 10,585,656 B1 | 3/2020 | Das et al. |
| 10,630,808 B1 * | 4/2020 | Watt ........................ H04L 67/63 |
| 11,151,025 B1 | 10/2021 | Gupta |
| 11,157,253 B1 | 10/2021 | Shteyman et al. |
| 11,595,495 B2 | 2/2023 | Garg et al. |
| 11,782,689 B1 | 10/2023 | Costello et al. |
| 2003/0182652 A1 | 9/2003 | Custodio |
| 2004/0261053 A1 | 12/2004 | Dougherty et al. |
| 2007/0250575 A1 | 10/2007 | Tseitlin et al. |
| 2009/0300580 A1 | 12/2009 | Heyhoe et al. |
| 2016/0132325 A1 | 5/2016 | Elder et al. |
| 2017/0352073 A1 | 12/2017 | Musti et al. |
| 2018/0295033 A1 | 10/2018 | Vladimirskiy et al. |
| 2018/0321926 A1 | 11/2018 | Kibel et al. |
| 2019/0026085 A1 | 1/2019 | Bijani et al. |
| 2020/0125352 A1 | 4/2020 | Kannan et al. |
| 2020/0133651 A1 | 4/2020 | Holzer et al. |

(Continued)

*Primary Examiner* — Keshab R Pandey
(74) *Attorney, Agent, or Firm* — Leason Ellis LLP

(57) ABSTRACT

Application deployment and operation is provided. Information associated with a respective application is processed, including to determine a respective version of the application and a configuration of at least some of the application. As a function of the processing, configuration information representing the configuration of at least some of the respective version of the application is generated. By processing at least the configuration information, the version of the application is assigned for operation in a respective one of a plurality of deployment environments, while at least one other version of the application operates in at least one other of the plurality of deployment environments. As a function of at least the version of the application and respective computer-based roles, at least some of the computer network traffic associated with respective ones of computing devices to respective ones of the plurality of deployment environments where respective versions of the application operate.

19 Claims, 7 Drawing Sheets

(56) References Cited

U.S. PATENT DOCUMENTS

| | | | |
|---|---|---|---|
| 2020/0241864 A1 | 7/2020 | Duvur et al. | |
| 2020/0356415 A1* | 11/2020 | Goli | G06N 20/00 |
| 2021/0216295 A1 | 7/2021 | Vincent et al. | |
| 2021/0382703 A1 | 12/2021 | Kurtev et al. | |
| 2023/0176837 A1 | 6/2023 | Sethi et al. | |

* cited by examiner

SYSTEM AND PROCESS FOR ELIMINATING THE RISK IN MONOLITHIC APPLICATION DEPLOYMENT

FIELD

The present disclosure relates, generally, to information technology systems and, more particularly, to mitigating deployment risks associated with monolithic computer-implemented applications.

BACKGROUND

Organizations across various industries develop computing applications using a monolithic application architecture, which can include on a single codebase for providing various functionality. A monolithic architecture is particularly useful for rapid programming code development, consistency and simplicity, and can be cost-effective to maintain. Despite these advantages, however, deploying changes or updates to applications in a monolithic architecture can be problematic for various reasons. For example, deploying changes in applications developed in a monolithic architecture can lead to unintended consequences, such as by introducing bugs or issues in a product that can impact aspects of one or more products. Further, following an application update, a discovery of a problem associated with the update can require a rollback to a previous version of the application, leading to a plethora of complex steps leading to computer downtime and disruption. Still further, a monolithic application architecture can have scalability challenges, which can require replicating an entire application stack, rather than scaling specific product/component types.

Any given enterprise can have dozens of particular computer hardware and software systems, such as authentication systems, front-end user interfaces, presentation layers, business logic systems, database management systems, and communications technology. Each respective system within such categories can be tied to one or more commercial products, which contributes to information technology complexity and difficulty for managing various applications and providing end-user services. This can cause hesitancy to onboard new asset classes and improvements in a monolithic application architecture.

It is with respect to these and other considerations that the disclosure made herein is presented.

BRIEF SUMMARY

The present disclosure includes systems and methods for controlling application deployment and operations. At least one computing device configured by processor-executed programming instructions can process information associated with a respective application version, wherein the processing includes determining a configuration of at least some of the application version. Moreover, the at least one computing device can generate, as a function of the processing, configuration information representing the configuration of at least some of the respective application version. By processing at least the configuration information, the at least one computing device can assign the application version to operate in a respective one of a plurality of application deployment environments while at least one other version of the application operates in at least one other of the plurality of deployment environments. Moreover, the at least one computing device can process at least some of the configuration information and respective information representing computer-based roles to route computer network traffic to respective ones of the plurality of deployment environments where respective versions of the application operate.

In one or more implementations, the at least one computing device can be configured to store the generated configuration information in at least one database, wherein the at least one database includes previously generated configuration information associated with other versions of the application. The step of routing can further comprise accessing, by the at least one computing device, at least some information stored in the at least one database, and determining, by the at least one computing device, as a function of the accessed information, respective versions associated with the application.

In one or more implementations, assigning the version of the application for operation in a respective one of a plurality of deployment environments further comprises identifying, by the at least one computing device, an other version of the application operating in the respective one of the plurality of deployment environments. The other version of the application can be assigned by the at least one computing device to operate in a different one of the plurality of deployment environments. The at least one computing device can remove the other version of the application from the respective one of the plurality of deployment environments and assign the version of the application to operate in the respective one of the plurality of deployment environments while the other version of the application operates in the different one of the plurality of deployment environments.

In one or more implementations, each of the plurality deployment environments is initially configured identically. At least one of the plurality of deployment environments can be a pre-pilot deployment environment, and at least one of the plurality of deployment environments can be a pilot deployment environment.

In one or more implementations, each of a plurality of computing devices routed to respective ones of the plurality of deployment environments is operated by an authenticated user.

In one or more implementations, the at least one computing device can identify at least one technical issue associated with the version of the application and replace the version of the application in the respective one of the plurality of deployment environments with at least one other version of the application.

In one or more implementations, the at least one computing device can identify at least one technical issue associated with the version of the application and re-assign the computer network traffic from the respective one of the plurality of deployment environments to an other of the plurality of deployment environments.

In one or more implementations, the version of the application includes at least one user interface and further wherein each other version of the application includes a user interface that is different from the user interface included in the version of the application.

In one or more implementations, the computer network traffic is associated with respective ones of computing devices.

In one or more implementations, at least some of the computer network traffic is routed to the respective one of the plurality of deployment environments.

In one or more implementations, the respective versions of the application represent development stages of the application over time.

In one or more implementations, a majority of the computer network traffic is routed to one of the deployment environments that hosts a most developed version of the application.

In one or more implementations, the application includes a user interface generated as a function of a user interface framework.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION OF THE EMBODIMENTS

Figure 1A:
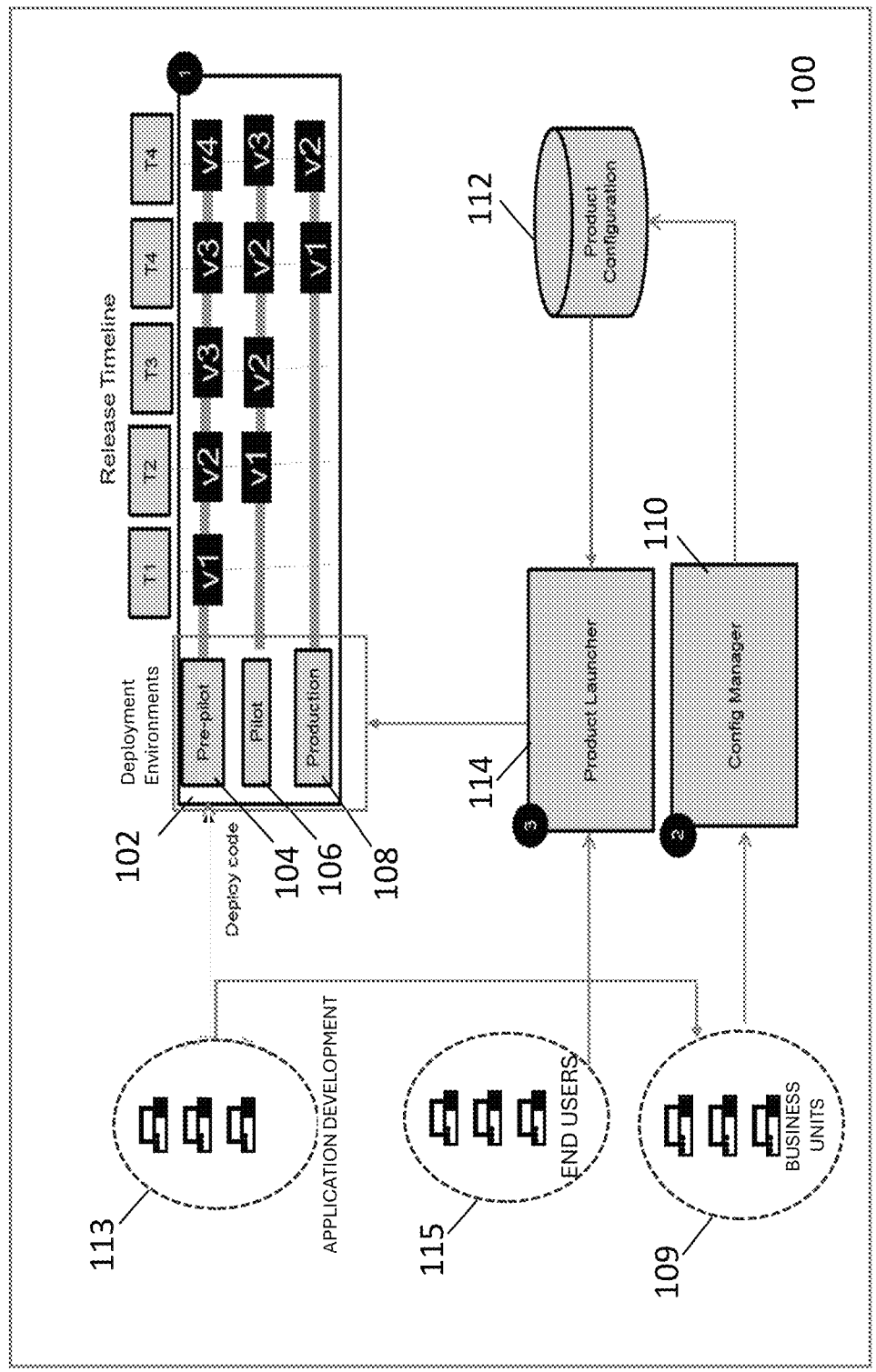
FIGS. 1A and 1B show a high-level overview of an example architecture in accordance with one or more implementations of the present disclosure.

By way of summary and introduction, the present disclosure regards technological subject matter that can be implemented for mitigating or eliminating risk associated with deploying monolithic applications. The present disclosure includes systems and methods for deploying applications, including applications supporting unified layouts of screen displays, which can include graphical screen controls accommodating a plurality of asset classes and devised into a generalized process. For example, generalized processes in a monolithic application can include steps for order entry, validation, and submission, each of which can cater to all asset classes. While such processes in a monolithic application can be generic in nature, support can be provided for individual product variations that effectively function within the framework. As used herein, a "product" can refer to one or more computer-application features that can be provided in one or more combinations. For example, products can provide computer functionality for respective business units in the enterprise.

Moreover, the present disclosure supports deployment of monolithic applications having common front-end user interface features, while simultaneously supporting vastly different backend processes and rules. A front-end user interface ("UI") framework can be employed, including development tools and libraries for generating common components, for example, graphical screen controls (e.g., drop-down lists, text-boxes, check boxes, radio buttons, or other components), as well as utility and product specific components operate in a unified manner. Employing a UI framework together with operations components supports rapid development and deployment of multi-product monolithic UI applications.

In one or more implementations, a structured deployment architecture is provided that includes a plurality of identical computing environments (e.g., three environments) configured to host different versions of a monolithic application. Versions of the application can represent respective development stages of the application over time The architecture can include one or more computer-based modules configured as a product launcher for routing (e.g., directing or redirecting) computer network traffic to respective application deployment environments. As used herein computer network traffic refers, generally, to data packets that can move via computer network communications. Such due to data access requests to and responses from software applications, data, and various computer resources hosted on remotely located networked computing devices.

Implementations of the present disclosure can include computer-based modules can include combinations of processor executable instructions and hardware that operate in response to implement features and functionality shown and described herein support products, services, features, and combinations thereof. Computer-based modules can include, among others, one or more virtual machines, hypervisors, web servers, software applications, and/or database servers. Moreover, computer-based modules can operate independently, in combination, and can depend on one or more other modules during operation.

Continuing with features shown and described herein, computer network traffic to can be routed to particular deployment environments hosting respective versions of an application. For example, network traffic can be channeled for a respective product version having corresponding functionality and configuration, as well as users' authorization and corresponding rights to access to information and processes. The various combinations of features set forth in the present disclosure provide robust and resilient computer-implemented systems and measures that operate to support deployment of various versions of monolithic applications to enhance reliability in software delivery operations reduce application deployment-related risks.

In one or more implementations, risk can be managed as a function of a plurality (for example, three) simultaneously operating and identically configured production environments. Various versions of an application can assigned to operate in the respective environments. Although many of the example implementations shown and described herein regard three respective deployment environments, one of ordinary skill that fewer or more deployment environments can be employed for hosting respective versions of an application without departing from the teachings herein. Further, more than one application can operate within a single respective deployment environment, for example, for supporting interactions between applications. In these and other implementations, the present disclosure supports, at any given time, operations of a plurality of (e.g., three) different production-ready versions of a monolithic application, as each deployment environment hosts a respective version. Accordingly, more than one product or application launch point can operate within a single respective development environment.

Installing updates to monolithic applications, for example, monolithic that include UI and other application changes can increase the risk of introducing bugs causing operational interruption, data corruption, or the like. The redundant production environments shown and described herein address such risk, by supporting pre-pilot and pilot testing of application version releases, thereby increasing assurance of operational stability and accuracy. For example, a computer-implemented pre-pilot initial testing stage can be provided where application changes can be deployed and used with little to no likelihood of introducing bugs and errors into production. Providing a preliminary testing stage in advance of broader testing in the enterprise allows for early bug detection and, correspondingly, risk mitigation. A broader pilot testing environment enables broader testing and evaluation of changes, prior to full deployment to production. Pilot testing also reduces the risk of interruption or computer-related problem negatively impacting end-users. Thereafter, production testing results in fully tested and validated changes to provided end-users, ensuring production-ready stability and reliability.

Referring now to the drawings, FIG. 1A shows a high-level overview of an example architecture 100 in accordance with one or more implementations of the present disclosure. Architecture 100 supports a plurality of deployment environments 102, which include pre-pilot environment 104, pilot environment 106, and production environment 108. As illustrated in FIG. 1A, respective versions of an application (e.g., a monolithic application), shown as V1, V2, V3, and V4, respectively operate in environments 104, 106, and 108 at release timelines T1, T2, T3, and T4. For example, at time T2, V1 of a monolithic application operates in pilot environment 106 and V2 of the monolithic application operates in pre-pilot environment 104. At time T3, version V3 replaces version V2 in pre-pilot deployment environment 106 and V2 replaces version V1 in pilot deployment environment 106. As illustrated in FIG. 1A, application versions can operate in one or more deployment environments 102 and accessed by various user computing devices, in accordance with the features shown and described herein.

Continuing with reference to the example deployment architecture 100 represented in FIG. 1A, a configuration manager 110 module receives input from computing devices associated with operations personnel 109 (e.g., in the enterprise). Computer applications developed in the enterprise, such as monolithic applications, via computing devices 113 and/or information associated with the applications can be received by "operations" computers. Information regarding monolithic applications can be processed by configuration manager 110 module for determining the state of a respective version, such as an initial or early release of an application, as opposed to an application having many previous versions. Operations computing device can process logs regarding developed applications and, at each load level, assigning network computing traffic to respective deployment environments, such as a function of roles.

With reference to Table 1, below, configurations are shown including User Type, Property, Value, and Redirection. Table 1 identifies values that are usable when a user associated with a respective user type launches a product and is to be redirected to a respective target environment. Such redirection can occur by default, for example, as shown in Table 1. The User Type column of Table 1, includes "prepilot," "pilot," and "nationwide." Users of the prepilot type are identified, for example, to use new features of any product and, in response, to provide feedback associated therewith. Users of the pilot type are identified, for example, for using features following users of the prepilot type and to provide feedback therewith. Users of the nationwide type represent a population of users operating products in production environments, for example, in the enterprise.

Continuing with reference to Table 1, below, Property column represents a user's product launchpoint and includes attributes identifying a user's respective user type and product being accessed. For example, uoe.launcher.uit.Nationwide represents a user of the nationwide user type accessing a UIT product route within a monolithic application. In another example, uoe.launcher.uit.Prepilot refers to a user of the prepilot user type accessing the UIT product route within the monolithic application.

Continuing with reference to Table 1, below, the Value column includes attributes representing a target environment. For example, entries in the Value column are usable to define a respective target environment for which the corresponding user type and product set in the Property column is to be redirected. For example, a value in the Property column representing a respective launch point can equal uoe.launcher.uit.pilot and the corresponding entry in the Value column can equal nationwide to represent the user's target environment. The Redirection column in Table 1 identifies respective redirection values.

TABLE 1

| User Type | Property | Value | Redirection |
| --- | --- | --- | --- |
| Nationwide | uoe.launcher.uit.Nationwide | | UIT Nationwide Users -> Nationwide Prod |
| Nationwide | uoe.launcher.uit.Nationwide | -b | UIT Nationwide Users -> Nationwide Prod-b |
| Nationwide | uoe.launcher.uit.Nationwide | pilot-b | UIT Nationwide Users -> Pilot Prod-b |
| Nationwide | uoe.launcher.uit.Nationwide | prepilot-b | UIT Nationwide Users -> PrePilot Prod-b |
| Nationwide | uoe.launcher.uit.Nationwide | pilot | UIT Nationwide Users -> Pilot Prod |
| Nationwide | uoe.launcher.uit.Nationwide | prepilot | UIT Nationwide Users -> PrePilot Prod |
| Pilot | uoe.launcher.uit.Pilot | | UIT Pilot Users -> Pilot Prod |
| Pilot | uoe.launcher.uit.Pilot | -b | UIT Pilot Users -> Pilot Prod-b |
| Pilot | uoe.launcher.uit.Pilot | nationwide-b | UIT Pilot Users -> Nationwide Prod-b |
| Pilot | uoe.launcher.uit.Pilot | prepilot-b | UIT Pilot Users -> PrePilot Prod-b |
| Pilot | uoe.launcher.uit.Pilot | nationwide | UIT Pilot Users -> Nationwide Prod |
| Pilot | uoe.launcher.uit.Pilot | prepilot | UIT Pilot Users -> PrePilot Prod |
| prepilot | uoe.launcher.uit.Prepilot | | UIT prepilot Users -> prepilot Prod |
| prepilot | uoe.launcher.uit.Prepilot | -b | UIT prepilot Users -> prepilot Prod-b |
| prepilot | uoe.launcher.uit.Prepilot | nationwide-b | UIT prepilot Users -> Nationwide Prod-b |
| prepilot | uoe.launcher.uit.Prepilot | pilot-b | UIT prepilot Users -> pilot Prod-b |
| prepilot | uoe.launcher.uit.Prepilot | nationwide | UIT prepilot Users -> Nationwide Prod |
| prepilot | uoe.launcher.uit.Prepilot | pilot | UIT prepilot Users -> pilot Prod |

Application information can be generated, managed, and stored, such as by product configuration module 110, that can store, access and/or manage respective application product configuration information. For example, at each load level, data processed to one or more production users (e.g., majority of users on the order of 20K users), and the respective deployment environments (c., pre-pilot, pilot, or production), based for example on the respective application and application version and of role of the respective users. For example, of the 20,000 production users, 900 are routed to the application operating in the pilot deployment environment, and 100 users to the application operating in the pre-pilot deployment environment.

Continuing with reference to FIG. 1A, configuration manager module 110 can send information representing the application configuration, such as including version, received from operations personnel to product configuration database 112, which can comprise one or more databases. information stored in product configuration database 112 can, thereafter, be used in be transmitted to product launcher module 114 and a respective application release can be transmitted for installation in one or more of the deployment environments. In this way, a plurality of respective versions of a monolithic application can be stored in one or more of the respective, albeit identical, deployment environments 104, 106, and 108.

The example computer-implemented architecture 100 shown in FIG. 1A provides a provides for a structured approach to application deployment, including as a function of distinct deployment environments (e.g., pre-pilot environment 104, pilot environment 106, and production environment 108). The result is a systematic approach allowing for thorough testing and validation before application (e.g., monolithic application) changes are deployed into production, thereby reducing the risk of unintended consequences.

For example, and without limitation, early bug detection and risk mitigation is effected in an initial testing stage (via pre-pilot environment 104), in which application (e.g., monolithic application) changes are tested rigorously in advance of broader testing. This early testing improves bug and issue detection early in the development cycle, enabling proactive risk mitigation strategies. Further, the architecture 100 is effective to reduce negative impacts on end-users, by enabling broader testing and evaluation of changes with a subset of users in advance of full deployment to production. The phased approach afforded by the teachings herein reduces risk of impacting end-users simultaneously and allows for fine-tuning based on user feedback.

Still further, the architecture 100 ensures stability and reliability by deploying fully tested and validated changes to end-users in a production environment 108. Only changes that have passed rigorous testing and validation are deployed, minimizing the risk of downtime or unexpected behavior. The product launcher module 114 processes information associated with the respective application to efficiently routes user application (e.g., monolithic application) traffic to respective deployment environments 104, 106, 108 in accordance with configuration setting information. For example, a respective user role, product being launched, and associated configuration information. Product launcher module 114 can operate to route end user 113 data traffic direct to a respective appropriate deployment environment 102 (e.g., pre-pilot environment 104, pilot environment 106, or production environment 108) based on predefined rules, resource utilization and optimization, and measure to ensure smooth deployment processes. Along with routing to a respective environment, configuration information can be updated to redirect across environment on a product-by-product basis, as needed. For example, with reference to Table 1, above, a value in the Property column includes a product launch point that equals uoc.launcher.uit.pilot. Continuing with this example, a value in the Value column representing a target environment can equal nationwide, meaning pilot users who launch the UIT product are to be redirected to the UIT Nationwide environment. This example represents the usefulness of the present disclosure, for example, in case of an issue associated with a new feature released in the UIT product and, in such case, UIT users within a pilot environment can be automatically redirected to a production (e.g., nationwide) environment. Alternatively, pilot users accessing one or more other (e.g., different) products can be redirected to a pilot environment in connection with such one or more other product. In this way, only pilot users of a respective (e.g., UIT) product are to be redirected to Nationwide, which continuing to be redirected to a pilot environment for other product(s).

Figure 1B:
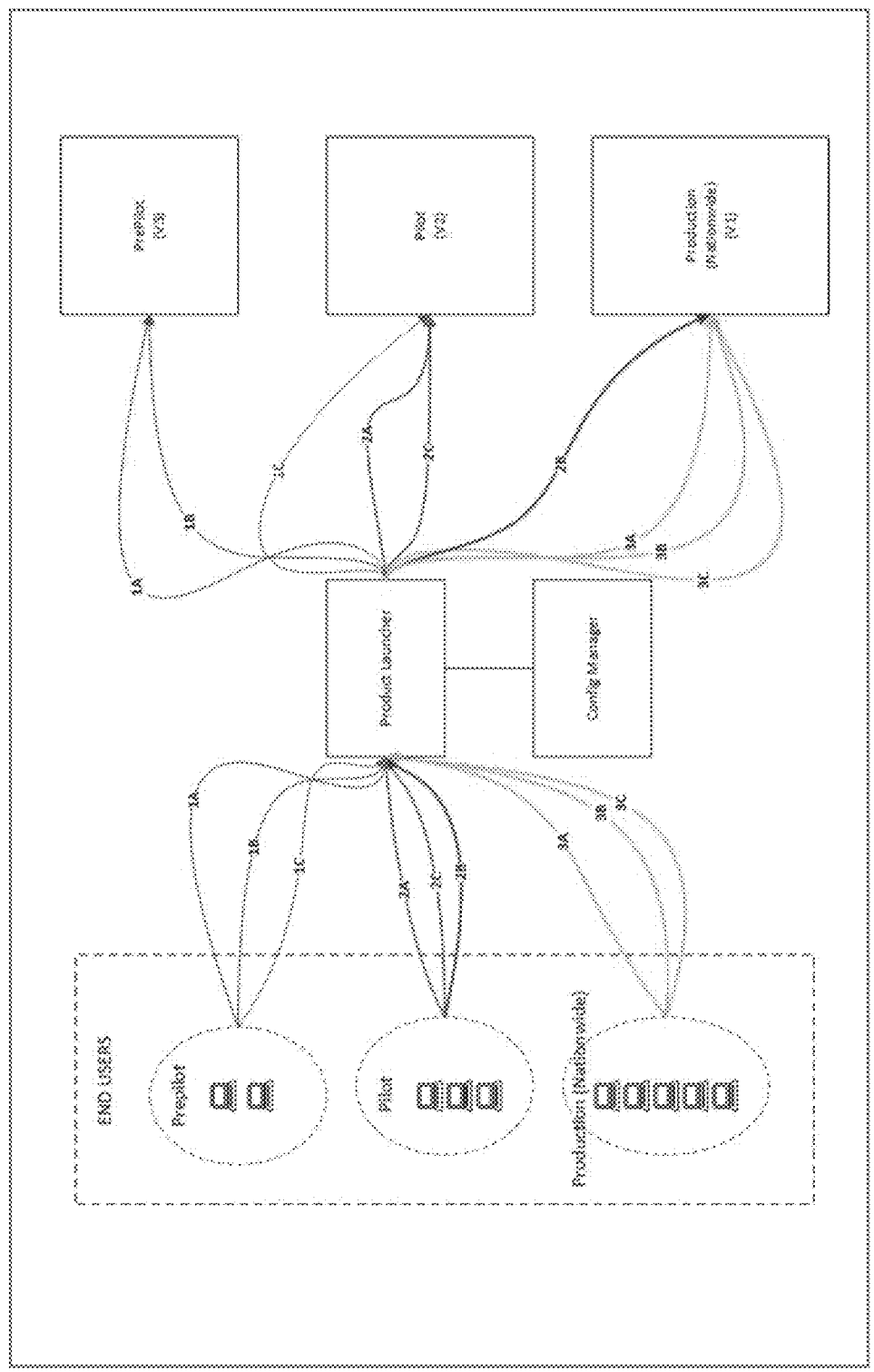

FIG. 1B illustrates an example implementation including routing respective user computing device associated with pre-pilot, pilot, and production user types to pre-pilot, pilot, and production environments. The present disclosure provides for granular configuration management, in which a product level configuration module handles independent deployment and configuration of different products or features within a monolithic application. This granular level of configuration management enhances flexibility and reduces deployment risks by enabling or disabling specific application program features or products to be deployed independently.

Figure 2:
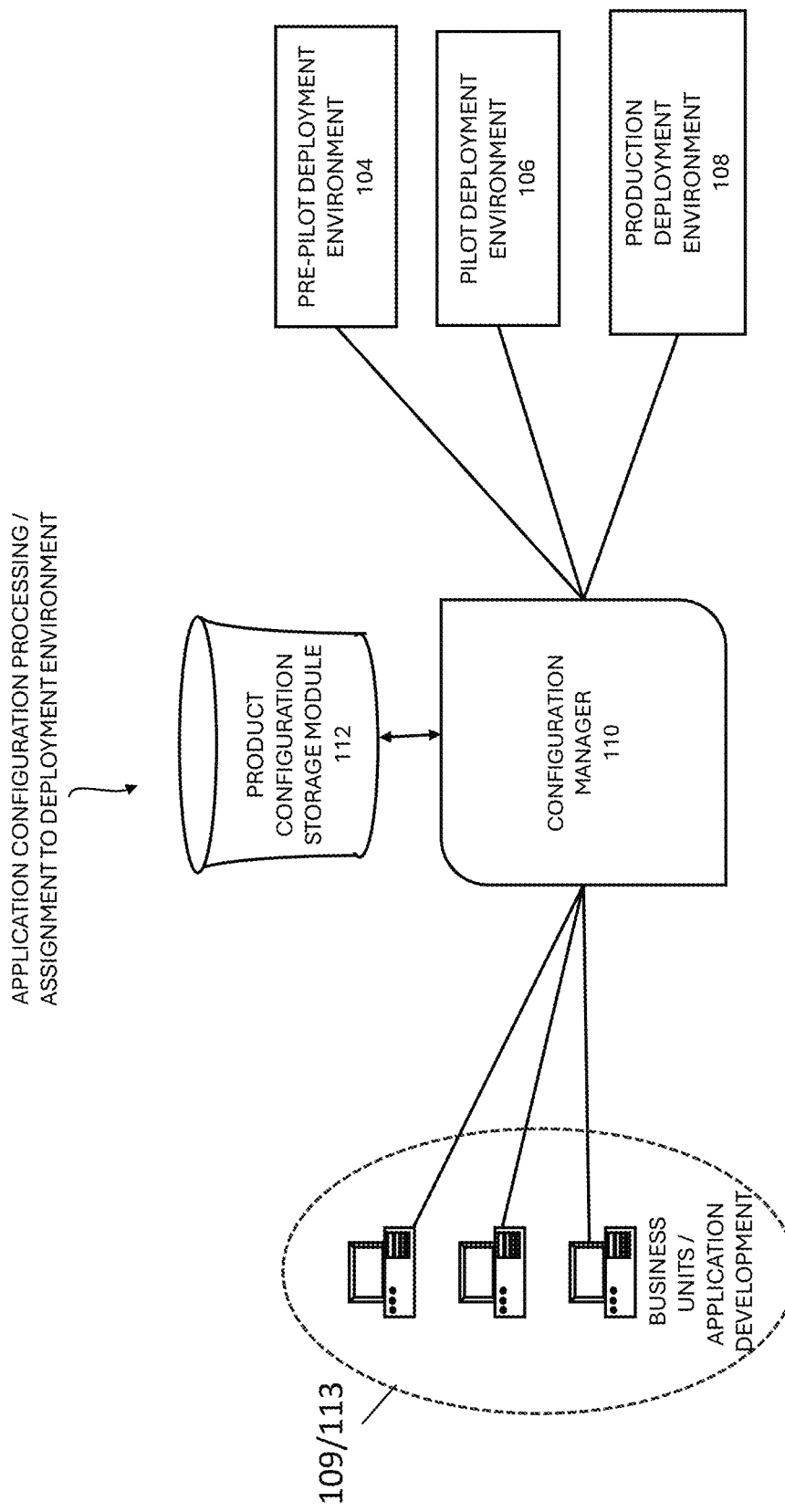
FIG. 2 illustrates a plurality of example computer-implemented operational interactions and modules providing at least some of features shown in FIG. 1 and described herein.

FIG. 2 illustrates a plurality of computer-implemented operational interactions and example modules providing at least some of features shown in FIG. 1 and described herein. Information associated with respective versions of one or more applications (e.g., monolithic applications) can be received and processed by configuration manager 110. For example, information from respective business units in the enterprise and application development associated therewith can be received from computing devices associated with various operations personnel. Processing the received information provides the ability to determine a respective application and respective version thereof, and for assigning the application to a respective deployment environment.

In one or more implementations of the present disclosure, configuration manager 110 can include a machine learning module and/or an artificial intelligence module for processing application information and assigning respective versions (e.g., V1, V2, V3, and V4) of one or more applications to a respective deployment environment 102 (e.g., pre-pilot environment 104, pilot environment 106, or production environment 108), substantially automatically. Information associated with previously processed application versions and respective user roles can be form a basis for machine learning, thereby enabling automatic processing and assignment of future applications to respective deployment environments 102. Artificial intelligence can monitor these key metrics and using training of the previous processed information for substantially automatic decision making.

Figure 3:
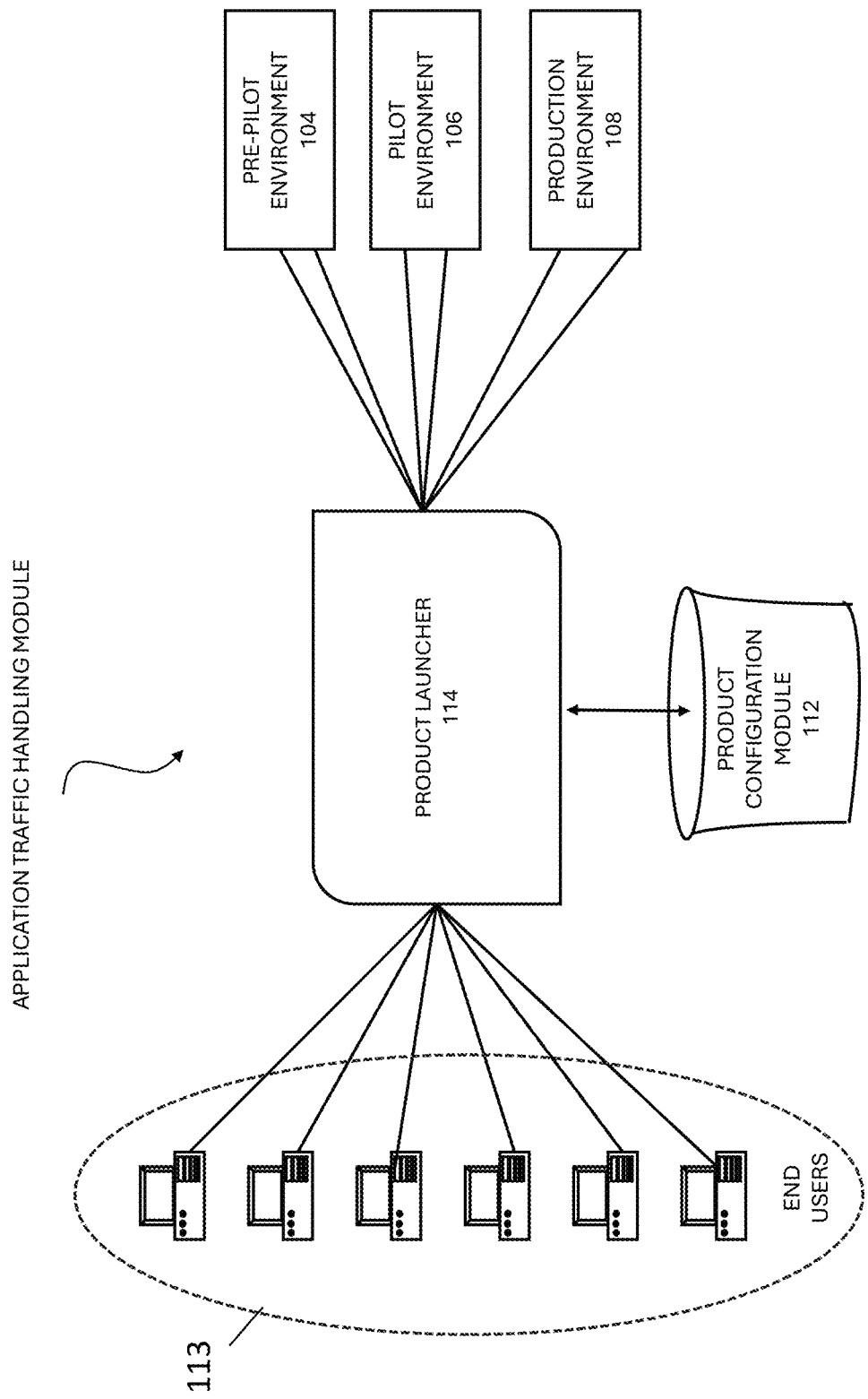
FIG. 3 illustrates a plurality of operations interactions between example modules providing at least some features and functionality shown in FIG. 1 and described herein.

FIG. 3 illustrates a plurality of operation interactions between example modules 200, thereby providing at least some of features shown in FIG. 1 and described herein. A plurality of computing devices operated by end users 113 operate to launch respective products. Product launcher operates, including as a function of information representing respective versions of applications being accessed and roles associated with the user traffic, to route traffic to deployment environments 102, such as pre-pilot deployment environment 104, pilot deployment environment 106, and production deployment environment 108.

As noted herein, the present disclosure addresses technical shortcomings and difficulties associated with reliable, smooth, and efficient application (e.g., monolithic application) deployment. The features shown and described herein minimize risks, enhance system stability, and streamline the maintenance and evolution of monolithic applications.

In one or more implementations of the present disclosure, information representing application endpoints can be used by the configuration manager 110. As known in the art, information representing application endpoints can include points of interaction within, with, and/or between an application (e.g., a monolithic application) and devices, components, services, or separate applications. For example, a single user interface can be configured to have dozens of respective different launch points that can be selected for, for example, order entry, validation, submission, or virtually any other task(s). The respective application endpoints are usable for routing, for example, computing devices associated with production-ready users to respective ones of the deployment environments 102.

Figure 4:
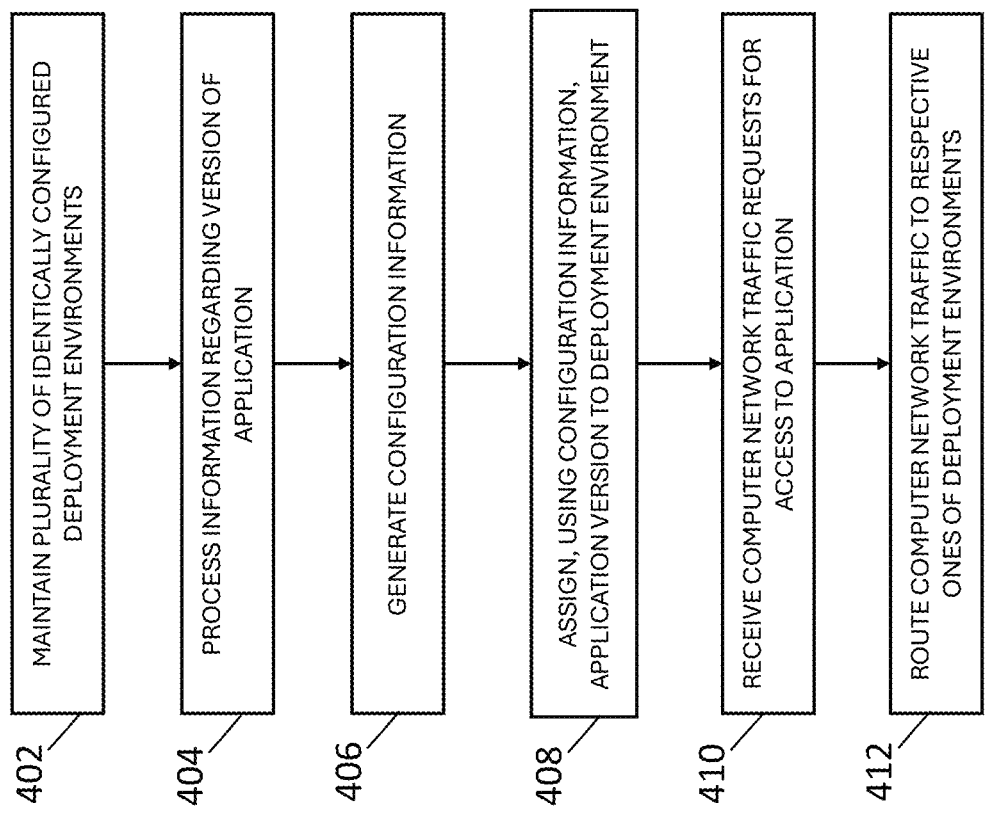
FIG. 4 is a flow chart illustrating example steps in a high-level process flow associated with an example implementation of the present disclosure.

FIG. 4 is a flow chart illustrating example steps in a high-level process flow associated with an example implementation of the present disclosure. It should be appreciated that several of the logical operations described herein can be implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 4, the process starts and a plurality of identically configured computing deployment environments are maintained (step 402). At step 404, information regarding a respective version of an application, such as a monolithic application supporting a plurality of interfaces, is processed (step 404). At step 406, information associated with the configuration of the respective version of the application is generated. The generated configuration information is used for assigning the application version to a respective one of the plurality of deployment environments (step 408). Thereafter, at step 410, computer network traffic requests for access to the application are received and, at step 412, the computer network traffic is routed to respective ones of the plurality of deployment environments. In one or more implementations of the present disclosure, computer network traffic including requests for access to the application is routed to the respective one deployment environment.

Accordingly, the present disclosure provides solutions that reduce or eliminate risks associated with deploying new releases associated with monolithic applications. The architecture and modules set forth in the present disclosure address challenges associated with new releases associated with monolithic applications introducing unintended consequences, such as bugs or issues that impact other parts of the application. The application reduces or eliminates downtime, degraded performance, or negative user experience issues, as well as risks caused by new releases that increase support overhead, user dissatisfaction, and potential revenue loss.

Further, the features set forth herein provide for new forms of granularity that enables rolling back changes in monolithic applications without reverting an entire application to a previous state. The architecture and features shown and described herein overcome technical challenges and can quickly address issues, including to preclude disrupting an entire system upon discovery of an error. The technical results include reducing recovery times during rollback options, reducing or eliminating downtime, operational disruptions, business continuity interruptions, and user dissatisfaction.

Still further, the present disclosure reduces or precludes complexities associated with scaling monolithic applications, including by eliminating a need to replicate an entire application stack, including components, that may not need scaling. The approach leads to improved resource efficiency and scalability. Scalability challenges eliminated by the teachings herein can include performance bottlenecks, increased infrastructure costs, and difficulties in handling sudden spikes in user traffic or workload.

The structured deployment approach (e.g., pre-pilot, pilot, and production deployment environments) provide for thorough application testing and early bug detection, particularly during rigorous pre-pilot testing. The impact to end-users by testing changes with a subset of users in the pilot phase. Optimizes traffic routing and configuration management at product level for the efficient deployment processes and enabling risk mitigation.

Certain technical benefits include efficient traffic routing and configuration management within the monolithic application based on configuration settings. This can ensure that changes deployed to a respective appropriate environment (e.g., Pre-Pilot, Pilot, or Production) based on predefined rules, optimizing resource utilization and deployment efficiency. This can reduce negative impact on end-users.

Moreover, the present disclosure provides for enhanced system stability and reliability. By deploying fully tested and validated changes to end-users in the production environment, the present disclosure improves system stability and reliability. The risk of downtime, errors, and unexpected behavior is reduced, as a more reliable and consistent user experience.

Figure 5:
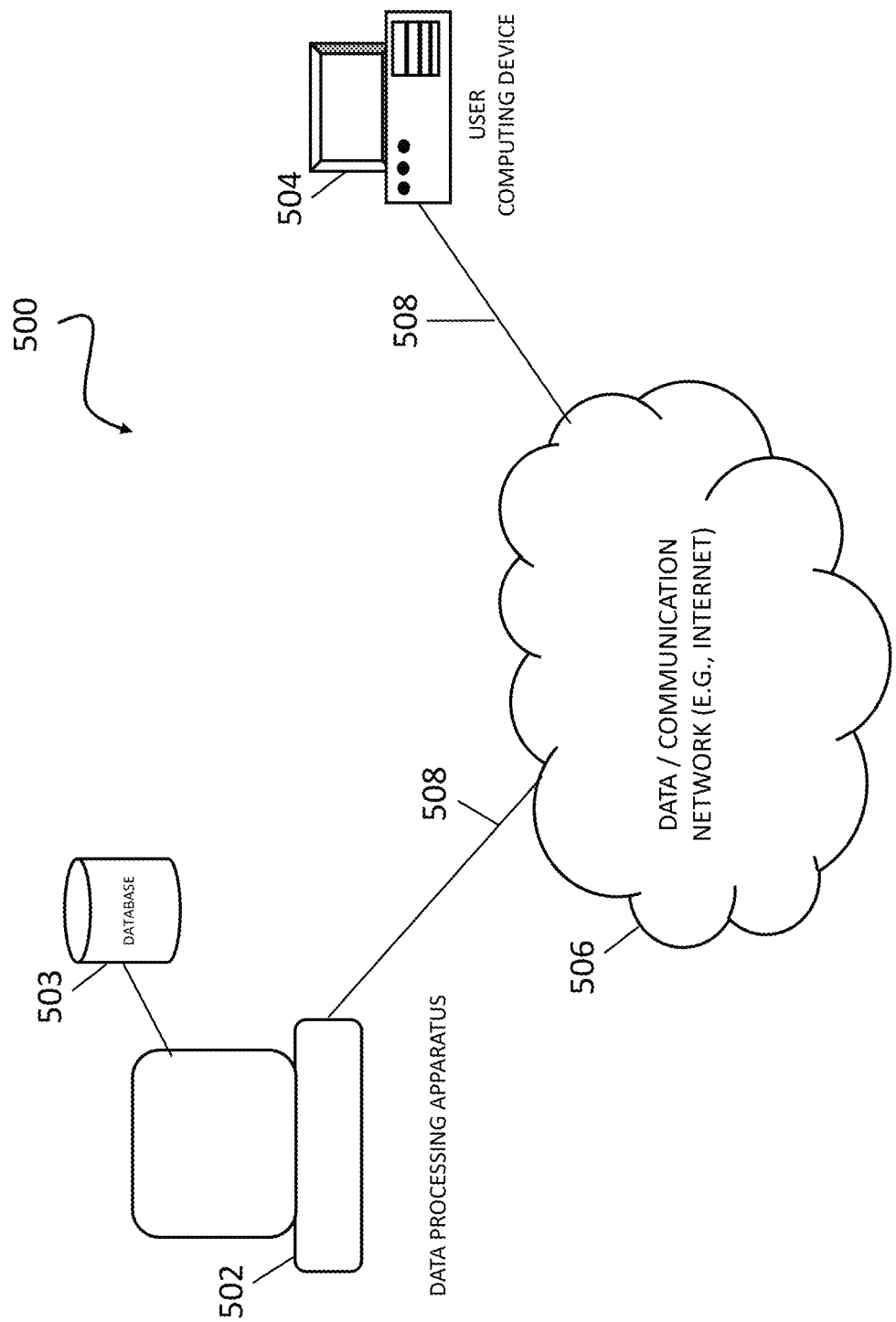
FIG. 5 is a diagram that shows an example hardware arrangement configured for providing the systems and methods disclosed herein.

Referring to FIG. 5, a diagram is provided that shows an example hardware arrangement that is configured for providing the systems and methods disclosed herein and designated generally as system 500. System 500 can include one or more information processors 502 that are at least communicatively coupled to one or more user computing devices 504 across communication network 506. Information processors 502 and user computing devices 504 can include, for example, mobile computing devices such as tablet computing devices, smartphones, personal digital assistants or the like, as well as laptop computers and/or desktop computers, server computers and mainframe computers. Further, one computing device may be configured as an information processor 502 and a user computing device 504, depending upon operations being executed at a particular time.

With continued reference to FIG. 5, information processor 502 can be configured to access one or more databases 503 for the present disclosure, including source code repositories and other information. However, it is contemplated that information processor 502 can access any required databases via communication network 506 or any other communication network to which information processor 502 has access. Information processor 502 can communicate with devices comprising databases using any known communication method, including a direct serial, parallel, universal serial bus ("USB") interface, or via a local or wide area network.

User computing devices 504 can communicate with information processors 502 using data connections 508, which are respectively coupled to communication network 506. Communication network 506 can be any data communication network. Data connections 508 can be any known arrangement for accessing communication network 506, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 504 preferably have the ability to send and receive data across communication network 506, and are equipped with web browsers, software disclosures, or other means, to provide received data on display devices incorporated therewith. By way of example, user computing device 504 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 506, and that wireless communication can be provided between wireless devices and information processors 502.

System 500 preferably includes software that provides functionality described in greater detail herein, and preferably resides on one or more information processors 502 and/or user computing devices 504. One of the functions performed by information processor 502 is that of operating as a web server and/or a web site host. Information processors 502 typically communicate with communication network 506 across a permanent i.e., un-switched data connection 508. Permanent connectivity ensures that access to information processors 502 is always available.

Figure 6:
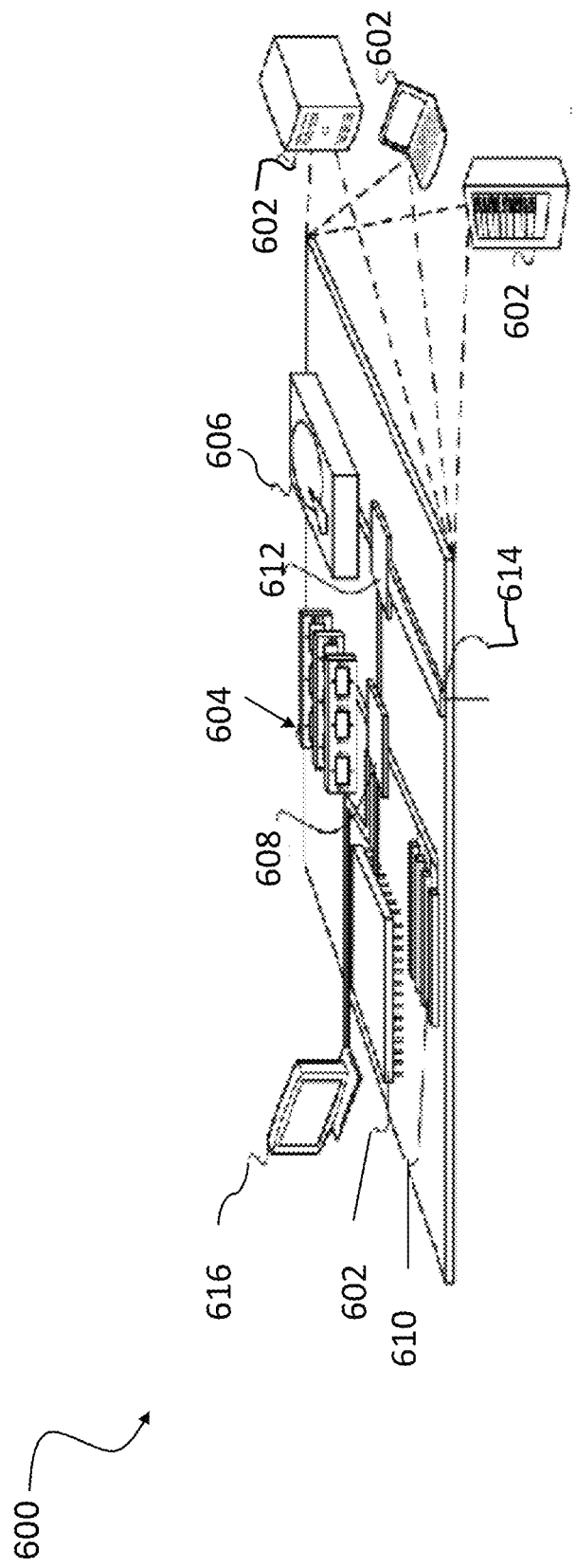
FIG. 6 shows an example information processor and/or user computing device that can be used to implement the techniques described herein.

FIG. 6 shows an example information processor 502 and/or user computing device 504 that can be used to implement the techniques described herein. The information processor 502 and/or user computing device 504 is intended to represent various forms of digital computers, such as laptops, desktops, workstations, personal digital assistants, servers, blade servers, mainframes, and other appropriate computers. The components shown in FIG. 6, including connections and relationships, and their functions, are meant to be exemplary only, and are not meant to limit implementations of the inventions described and/or claimed in this document.

As shown in FIG. 6, the information processor 502 and/or user computing device 504 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the information processor 502 and/or user computing device 504, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the information processor 502 and/or user computing device 504. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the information processor 502 and/or user computing device 504. In some implementations, the storage device 606 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 can be configured to manage bandwidth-intensive operations, while the low-speed interface 612 can be configured to manage lower bandwidth-intensive operations. Of course, one of ordinary skill in the art will recognize that such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In an implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as-laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for controlling application deployment and operation, the method comprising:
   processing, by at least one computing device configured by processor-executed programming instructions, information associated with a respective application version, wherein the processing includes determining a configuration of at least some of the application version;
   generating, by the at least one computing device as a function of the processing, configuration information representing the configuration of at least some of the respective application version;
   assigning, by the at least one computing device processing at least the configuration information, the application version to operate in a respective one of a plurality of application deployment environments while at least one other version of the application operates in at least one other of the plurality of deployment environments; and
   routing computer network traffic, by the at least one computing device processing at least some of the configuration information and respective information representing computer-based roles, to respective ones of the plurality of deployment environments where respective versions of the application operate,
   wherein the respective versions of the application represent development stages of the application over time.

2. The computer-implemented method of claim 1, further comprising:
   storing, by the at least one computing device, the generated configuration information in at least one database, wherein the at least one database includes previously generated configuration information associated with other versions of the application; and
   wherein the step of routing further comprises:
      accessing, by the at least one computing device, at least some information stored in the at least one database; and
      determining, by the at least one computing device, as a function of the accessed information, respective versions associated with the application.

3. The computer-implemented method of claim 1, wherein assigning the version of the application for operation in a respective one of a plurality of deployment environments further comprises:
   identifying, by the at least one computing device, an other version of the application operating in the respective one of the plurality of deployment environments;
   assigning, by the at least one computing device, the other version of the application to operate in a different one of the plurality of deployment environments and removing the other version of the application from the respective one of the plurality of deployment environments; and
   assigning, by the at least one computing device, the version of the application to operate in the respective one of the plurality of deployment environments while the other version of the application operates in the different one of the plurality of deployment environments.

4. The computer-implemented method of claim 1, wherein each of the plurality deployment environments is initially configured identically, and
further wherein:
   at least one of the plurality of deployment environments is a pre-pilot deployment environment, and
   at least one of the plurality of deployment environments is a pilot deployment environment.

5. The computer-implemented method of claim 4, wherein each of a plurality of computing devices routed to respective ones of the plurality of deployment environments is operated by an authenticated user.

6. The computer-implemented method of claim 1, further comprising:
   identifying, by the at least one computing device, at least one technical issue associated with the version of the application; and replacing the version of the application in the respective one of the plurality of deployment environments with at least one other version of the application.

7. The computer-implemented method of claim 1, further comprising:
identifying, by the at least one computing device, at least one technical issue associated with the version of the application; and
re-assigning the computer network traffic from the respective one of the plurality of deployment environments to an other of the plurality of deployment environments.

8. The computer-implemented method of claim 1, wherein the version of the application includes at least one user interface and further wherein each other version of the application includes a user interface that is different from the user interface included in the version of the application.

9. The computer-implemented method of claim 1, wherein the computer network traffic is associated with respective ones of computing devices.

10. The computer-implemented method of claim 1, wherein at least some of the computer network traffic is routed to the respective one of the plurality of deployment environments.

11. The computer-implemented method of claim 1, wherein a majority of the computer network traffic is routed to one of the deployment environments that hosts a most developed version of the application.

12. The computer-implemented method of claim 1, wherein the application includes a user interface generated as a function of a user interface framework.

13. A computer-implemented system for controlling application deployment and operation, the system comprising:
at least one computing device configured by processor-executed programming instructions for:
processing information associated with a respective application version, wherein the processing includes determining a configuration of at least some of the application version;
generating, as a function of the processing, configuration information representing the configuration of at least some of the respective application version;
assigning, by processing at least the configuration information, the application version to operate in a respective one of a plurality of application deployment environments while at least one other version of the application operates in at least one other of the plurality of deployment environments; and
routing computer network traffic, by processing at least some of the configuration information and respective information representing computer-based roles, to respective ones of the plurality of deployment environments where respective versions of the application operate,
wherein the respective versions of the application represent development stages of the application over time.

14. The computer-implemented system of claim 13, wherein the at least one computing device is further configured for:
storing the generated configuration information in at least one database, wherein the at least one database includes previously generated configuration information associated with other versions of the application; and
wherein the step of routing further comprises:
accessing at least some information stored in the at least one database; and
determining, as a function of the accessed information, respective versions associated with the application.

15. The computer-implemented system of claim 13, wherein assigning the version of the application for operation in a respective one of a plurality of deployment environments further comprises:
identifying an other version of the application operating in the respective one of the plurality of deployment environments;
assigning the other version of the application to operate in a different one of the plurality of deployment environments and removing the other version of the application from the respective one of the plurality of deployment environments; and
assigning the version of the application to operate in the respective one of the plurality of deployment environments while the other version of the application operates in the different one of the plurality of deployment environments.

16. The computer-implemented system of claim 13,
wherein each of the plurality deployment environments is initially configured identically, and
further wherein:
at least one of the plurality of deployment environments is a pre-pilot deployment environment, and
at least one of the plurality of deployment environments is a pilot deployment environment.

17. The computer-implemented system of claim 16, wherein each of a plurality of computing devices routed to respective ones of the plurality of deployment environments is operated by an authenticated user.

18. The computer-implemented system of claim 13, wherein the at least one computing device is further configured for:
identifying at least one technical issue associated with the version of the application; and
replacing the version of the application in the respective one of the plurality of deployment environments with at least one other version of the application.

19. The computer-implemented system of claim 13, wherein the at least one computing device is further configured for:
identifying at least one technical issue associated with the version of the application; and
re-assigning the computer network traffic from the respective one of the plurality of deployment environments to an other of the plurality of deployment environments.

* * * * *